Patented July 4, 1944

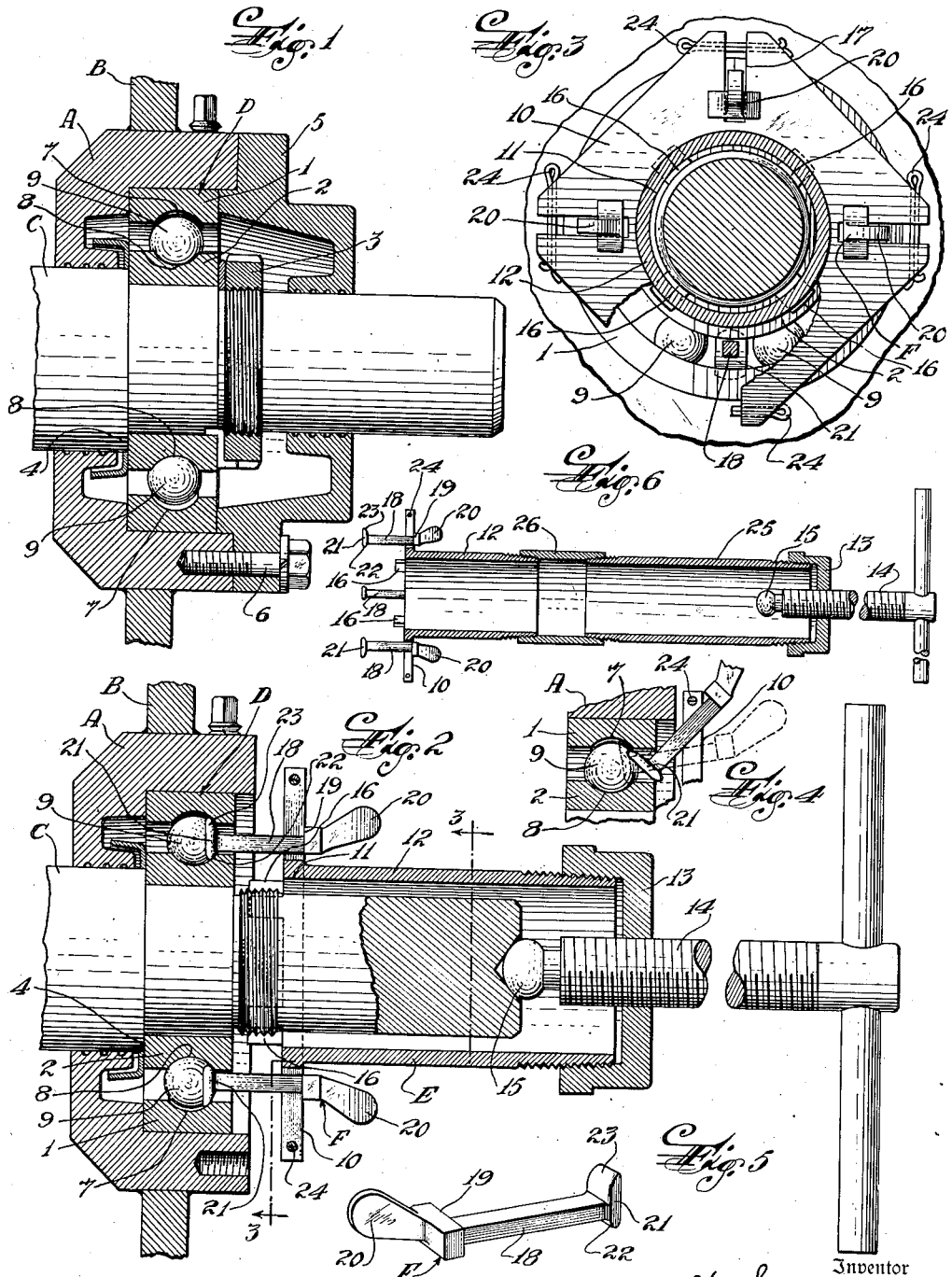

2,352,739

UNITED STATES PATENT OFFICE 2,352,739

BALL-BEARING PULLER

Arthur W. Sauer, Bloomfield, N. J., assignor to Star Electric Motor Company, Bloomfield, N. J., a corporation of New Jersey Application June 4, 1943, Serial No. 489,607

3 Claims. (Cl. 29—85)

This invention relates in general to a device for pulling ball bearings from machine shafts, particularly ball bearings which include an inner race ring mounted on a shaft or an outer race ring located in a bearing housing or both. It is well known that inner and outer race rings of ball bearings of this character generally are tightly fitted on the shaft or in the housing respectively, and great difficulty has been encountered in removing the bearing rings, especially those that are secured to shafts.

In efforts to solve this problem, special complicated bearing housings have been constructed to permit access to the bearings for connection thereto of bearing pullers, or in other words, the bearing housings have been built around or to accommodate a bearing puller. However, such structures take up too much space and require complex manipulation of parts which consume an excessive amount of time. Current practice demands a minimum consumption of space for the bearings and simple and rapid operations for removal of the ball bearings from the housings and shafts. Moreover, known bearing pullers are either too complicated, large or expensive, or are not sufficiently strong and reliable, or include parts which engage the ball raceways in such a manner as to dent, scratch or otherwise injure them.

Therefore, one object of my invention is to provide a puller for ball bearings which can be applied to a machine shaft and connected to the race rings of a ball bearing in a novel and improved manner, so that bearing housings can be compactly and simply constructed, a minimum of manipulation of parts shall be required to remove a ball bearing from its housing, and danger of damage to the raceways of the bearing shall be eliminated.

Another object is to provide such a ball bearing puller which shall embody novel and improved features of construction such that compactness, strength and reliability shall be ensured.

Further objects are to provide a device of this character which shall include novel and improved puller arms that can be inserted between and connected to both of the inner and the outer race rings of a ball bearing easily and quickly from one end of the bearing; and thus to provide such puller arms which shall be so shaped that they may be inserted between the race rings and caused to abuttingly contact the raceway of each ring, whereby the connection of the puller to the bearing can be rapidly and easily effected and damage to the raceways shall be obviated.

Other objects are to provide a novel and improved construction, combination and arrangement of such puller arms and a supporting plate therefor such that the puller arms shall be free to adjust themselves relatively to said plate and the bearing race rings to ensure balanced strains on the bearing rings, puller arms and supporting plate and to obviate binding, jamming and undue friction between the parts; and to obtain other advantages and results as will be brought out by the following description in conjunction with the accompanying drawing in which Figure 1 is a longitudinal sectional view through one type of ball bearing housing and a ball bearing for removal of which the puller embodying my invention is intended.

Figure 2 is a vertical longitudinal sectional view through my ball bearing puller showing the manner of connecting it to the ball bearing.

Figure 3 is a transverse vertical sectional view on the line 3—3 of Figure 2.

Figure 4 is a fragmentary sectional view of a ball bearing and a fragmentary side elevational view of one of the puller arms showing the manner of connecting the puller arm to the bearing.

Figure 5 is a detached enlarged perspective view of one of the puller arms and

Figure 6 is a fragmentary longitudinal vertical sectional view through a modification of the ball bearing puller.

As hereinbefore pointed out, current practice demands simple and compact ball bearing housings and easy and quick removal and replacement of ball bearings therein and my ball bearing puller has been designed to facilitate the accomplishment of these results.

For the purpose of illustrating the principles of the invention, I have shown one such ball bearing and housing therefor in Figure 1 of the drawing where the reference character A designates a cup-shaped housing body which is welded within for example the frame B of a motor and has a shaft C extending therethrough. Within the housing body is fitted a ball bearing D which comprises an outer race ring 1 which is seated in the housing body and an inner race ring 2 which is secured upon the shaft C. A clamping nut 3 on the shaft holds the inner race ring between itself and a shoulder 4 on the shaft and a cap 5 is removably attached to the housing body by bolts 6 for closing the open end of the body. The outer race ring has a raceway 7 while the inner race ring has a raceway 8, and balls 9 are arranged in the raceways as usual.

In order to pull the ball bearing D from the shaft and housing it is simply necessary to remove the cap 5, nut 3, slip the puller embodying the invention over the end of the shaft, and connect the puller arms to the ball bearing.

The ball bearing pulley comprises a support E such as a plate 10 which has an opening 11 therethrough to loosely receive the shaft C. Projecting from one side of the plate is a tubular shank 12 that preferably is welded to the plate coaxially with said opening. Upon one end of the shank is screw threaded a cap 13 in which is threaded a hand screw 14 that has a ball shaped head 15 to abut the end of the shaft C when the plate 10 is slipped over the shaft. Projecting from the side of the plate opposite the shank 12 are a plurality of lugs 16 which are arranged in circumferentially spaced relation with their inner surfaces disposed in an imaginary circle which is concentric with the opening 11 but of a slightly smaller diameter so that said inner surfaces of the lugs will slidably engage the shaft C and hold the support against tilting thereon.

A plurality of puller arms F are mounted in the support E in circumferentially spaced relation, each having one end formed for connection to a ball bearing D. Preferably each puller arm is free for movement in a radial plane of the opening 11 of the support, and it is desirable that each puller arm be free for movement of limited extent in all directions.

More specifically, the plate 10 has a plurality of radial slots 17 in each of which one of the puller arms is mounted and each puller arm includes a shank 18 that extends through the corresponding slot and has a shoulder 19 at one side of the plate to abut the latter. Preferably the puller arm has a finger piece 20 outwardly of the shoulder 19. One transverse or cross-sectional dimension of each puller arm extends in the direction of the corresponding slot 17 and is less than the length of the slot so that the puller arm may move laterally of itself and lengthwise of said slot. At the other side of the plate 10, each puller arm has a head 21 to abut the raceways 7 and 8 of both the race rings 1 and 2 of the ball bearing D. As shown, the head 21 extends laterally at opposite sides of the shank 18 and has one portion 22 to engage the raceway 8 of the inner ring and a longer portion 23 to engage the raceway 7 of the outer race ring 1. These portions 22 and 23 preferably have convex surfaces to contact with the raceways. The shanks and heads of the puller arms are so proportioned and so related to the space between the race rings of the ball bearing that the heads of the puller arms may be inserted between the race rings by tilting the puller arms in their radial planes in one direction as shown by solid lines in Figure 4. Then the heads may be caused to abut the raceways 7 and 8 by tilting the puller arms in the opposite direction, as shown by dot and dash lines in Figure 4 and in Figure 2. The head of each puller arm is of a thickness and width such that the head may lie between two adjacent balls in the ball bearing and between the median plane and one side of the raceways of said bearing. While it is not necessary, it is desirable that the shanks 18 of the puller arms be polygonal in cross section and of such size that rotation of the shanks in the respective slots 17 will be prevented. Each puller arm may have another cross-sectional shape, but it is preferable that at least one cross-sectional dimension, for example the diagonal dimension between two angles, be greater than the width of the corresponding slot to prevent rotation of the puller arm in said slot. However, the shanks are sufficiently loosely arranged in the slots to permit limited lateral movement of the shanks. Also the shanks may be moved longitudinally of themselves, such movement being limited by abutment of the heads 21 and the shoulders 19 with the plate 10. If desired the outer ends of the slots 17 may be permanently closed, but preferably removable cotter pins 24 are fitted across the ends of the slots to hold the puller arms against accidental displacement from the plate but to permit complete removal of the puller arms when desired.

In use of the bearing puller, the housing cap 5 is first removed after which the plate 10 and the tubular shank 12 are slipped longitudinally over the projecting end of the shaft with the lugs 16 sliding on the shaft. The plate is then rotated until the end of one of the puller arms is in line with a space between two of the balls 9, whereupon said puller arm is tilted and inserted through the space between the bearing rings and into contact with the raceways as above described. One of the puller arms having been connected to the bearing, it is a simple matter to connect the other puller arms to the bearing in the same manner, the first puller arm serving in effect as an index for automatically locating the other puller arms in proper relation to the spaces between the balls of the bearing. All of the puller arms having been connected to the bearing, the screw 14 is rotated to bring the head 15 thereof into contact with the end of the shaft so as to move the support E longitudinally of the shaft away from the bearing. Continued rotation of the screw will then exert tension on the puller arms so as to pull the ball bearing from the housing and shaft. The puller arms can then be separated from the bearing by tilting them as above described and as shown in Figure 4 and pulling them outwardly through the space between the bearing rings, or otherwise as may be desired.

It will be observed that the puller arms may adjust themselves under tension relatively to the raceways of the bearing and to the plate 10 so as to balance the strains on the bearing rings, puller arms and plate and to prevent binding, jamming and undue friction between the parts. Also, with this construction and operation there is a minimum of possibility of the raceways being damaged by the heads of the puller arms.

Where the end of the shaft projects a considerable distance beyond the bearing housing, the shank 12 of the support may be extended, for example by connecting an additional tubular shank section 25 to the end of the shank section 12 by a bushing 26, and placing the cap 13 on the outer end of the extension section 25, all as shown in Figure 6 of the drawing. This permits the bearing to be easily reached by the puller arms and at the same time allows contact of the screw 14 with the end of the shaft.

It will be understood by those skilled in the art that the screw or some equivalent means might be adapted for contact with some other fixed abutment than the shaft C.

While I have shown and described the invention as embodied in certain details of construction, it will be understood by those skilled in the art that many modifications and changes may be made in the construction of the bearing puller within the scope of the invention.

What I claim is:

1. A ball bearing puller comprising a support having an opening to slidably receive one end portion of a shaft and being provided with a plurality of radial slots, a puller arm for each slot including a shank which is longitudinally slidable through said slot and has an elongate substantially flat head located at one side of said support to simultaneously engage the raceways of both the inner and the outer race rings of a ball bearing, said shank having a shoulder at the other side of said support to abut the latter, the transverse dimension of each puller arm in the direction of the corresponding slot being less than the length of the slot so that said puller arm may move laterally of itself and lengthwise of said slot, said head of each puller arm comprising two portions of different lengths which extend in opposite directions laterally from said shank and have convex surfaces facing toward said shoulder to engage the curved surfaces of such raceways, the thickness and width of said head being such that the head may lie between two adjacent balls in such raceways and between the median plane and one side of the raceways, said head of each puller arm being adapted to be inserted between such race rings upon tilting of said puller arm in one direction in the plane of said slot and thereafter to abut such raceways upon tilting the puller arm in the opposite direction, and means mounted in said support to engage a fixed abutment and exert tension on said puller arms when the latter are connected to such ball bearing.

2. A bearing puller comprising a plate having a central opening therethrough and a tubular shank projecting from one side of said plate coaxial with said opening so said plate and shank can be slipped over the end of a shaft, said plate also having a plurality of radial slots, a puller arm in each slot including a shank which is longitudinally slidable through said slot and has an elongate substantially flat head located at one side of said plate to engage simultaneously the raceways of the inner and the outer race rings of a ball bearing, said shank having a shoulder at the other side of said plate to abut the latter, the transverse dimension of each puller arm in the direction of the corresponding slot being less than the length of the slot so that said puller arm may move laterally of itself and lengthwise of said slot, said head of each puller arm comprising two portions of different lengths which extend in opposite directions laterally from said shank and have convex surfaces facing toward said shoulder to engage the curved surfaces of such raceways, the thickness and width of said head being such that the head may lie between two adjacent balls in such raceways and between the median plane and one side of the raceways, said head of each puller arm being adapted to be inserted between such race rings upon tilting of said puller arm in one direction in the plane of said slot and thereafter to abut such raceways upon tilting the puller arm in the opposite direction, a cap on the end of said tubular shank opposite said plate, and a screw threaded in said cap to abut one end of said shaft for moving said support in one direction on said shaft to exert tension on said puller arms when the latter are connected to a ball bearing.

3. The ball bearing puller defined in claim 1 wherein said puller arms have one cross-sectional dimension that is greater than the width of the corresponding slot to prevent rotation of the puller arm in said slot.

ARTHUR W. SAUER.